June 21, 1960 W. N. LOW 2,942,226
PROTECTIVE COVER FOR APPLIANCE PLUGS
Filed Oct. 21, 1958

INVENTOR
WARREN N. LOW
BY
*Low & Low*
HIS ATTORNEYS

United States Patent Office 2,942,226
Patented June 21, 1960

2,942,226

PROTECTIVE COVER FOR APPLIANCE PLUGS

Warren N. Low, Chevy Chase, Md., assignor of one-half to Fahy Baker Low, Bethesda, Md.

Filed Oct. 21, 1958, Ser. No. 768,659

13 Claims. (Cl. 339—75)

The present invention relates to protective covers for flush-mounted electric outlets or plug receptacles, and is more particularly directed to a novel protective cover which encloses one or more appliance plugs, cooperating therewith to securely and readily mount the cover about the electric outlet without the use of additional securing means such as screws, nor requiring the employment of tools for the mounting operation. Further, the cover may be equally as readily demounted from its protective position.

An object of my invention is to provide a protective cover which effectively eliminates the danger of electrical shock to small children by preventing the possibility of bridging the live prongs of an appliance plug which is partially withdrawn from the electric outlet or receptacle.

Another object is to provide a protective cover incorporating novel means of securing the cover in position adjacent a vertically mounted electric outlet utilizing a unique cooperation between a portion of the protective cover housing and one or more enclosed appliance plugs.

An important feature of my novel construction is the provision of means associated with the protective cover whereby the enclosed appliance plugs may at any time be pushed or urged securely into their respective sockets in the event they become slightly withdrawn, without removing the plugs from the enclosing cover.

In addition, any effort by a child to remove the protective cover from its enclosing relation about appliance plugs inserted in a wall receptacle will entirely remove the plugs from the electric outlets, thereby preventing injury by contact with live exposed plug prongs.

Further, my novel protective cover is ornamental and attractive in appearance, concealing unsightly appliance plugs, and the cover may be so decorated to blend with the room decor.

These and other objects and advantage will become apparent from the following detailed description taken in connection with the drawings, in which.

While the novel construction and operation of my protective cover is readily adaptable for use with electric outlets having one, two, three or more plug receptacles, I have illustrated and will describe my invention as constructed and arranged to be used with the conventional and widely used two receptacle or duplex electric outlet.

Figure 1:
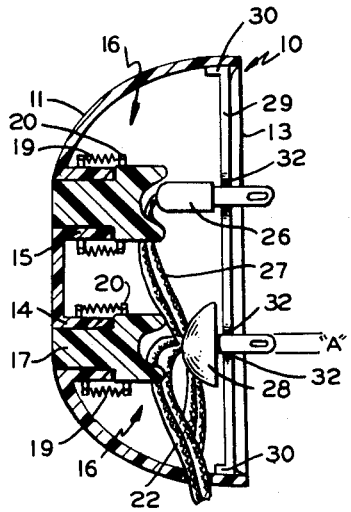
Fig. 1 is a side section thru a preferred embodiment of my protective cover, certain portions thereof being shown in elevation, the cover being shown in mounted position about a conventional duplex wall receptacle having two appliance plugs therein.
Figure 2:
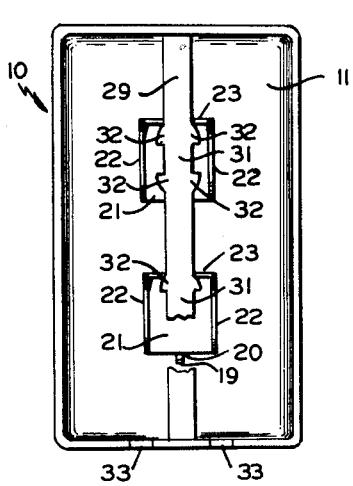
Fig. 2 is a front elevation of the protective cover of Fig. 1, a portion of the securing strip being broken away.
Figure 4:
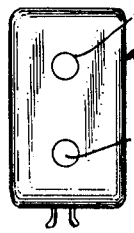
Fig. 4 is an elevation of reduced scale of the cover of Fig. 1 as seen from the rear or as viewed from the room in which the cover is used.
Figure 6:
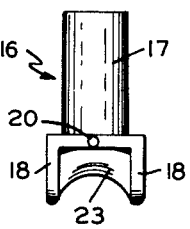
Fig. 6 is a bottom plan of the pusher of Fig. 5.

Referring to the drawings, the preferred form of the protective cover 10 is best seen in Figs. 1 and 2, and comprises a box-like housing 11 preferably molded from a dielectric material such as polyethylene or Bakelite. The housing is provided with a substantially rectangular open plane face bounded by the housing wall rim, in order to fit substantially flush against and around the cover plate 13 of a wall or floor electric outlet. The wall of the housing 11 may be suitably designed and ornamented to present a pleasing appearance for use in living quarters, such as the gently curved configuration illustrated. It is only requisite that the configuration of the housing not interfere with the construction and operation of the parts associated therewith to be now described.

Two circular apertures 14 are provided in the rear wall of the housing 11 communicating with the cylindrical bores of inwardly extending sleeves 15. The sleeves 15 are formed integrally with the housing 11 and extend inwardly only a short distance to provide bearing support for the reciprocable pushers or plug actuating members 16.

Figure 5:
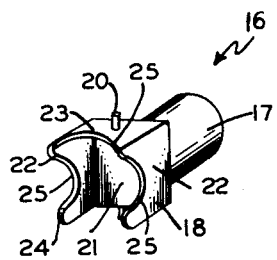
Fig. 5 is a perspective view of one of the pushers which are journalled in the rear wall of the cover housing.

The plug actuating members 16 are identical, and each comprises, as best seen in Fig. 5, a shank 17 of circular cross-section and of a diameter to freely slide in the housing sleeves 15, and a four-pronged plug-engaging head 18. Pairs of diametrically opposed small tension springs 19 are provided to normally urge the pushers 16 to the left as viewed in Fig. 1 with the rear face of the base 21 of the pronged head 18 abutting the inwardly facing end of the cylindrical sleeves 15. Each tension spring 19 is connected between the pusher 16 and the sleeve 15 by means of small radially projecting lugs 20 on the sleeve and on the pusher.

Additionally, the tension springs 19 effectively prevent relative rotation between the pusher 16 and the sleeve 15, thereby eliminating any possibility of misalignment between the pusher prongs 24, hereinafter described, and an appliance cord plug.

Alternatively, the shank 17 of the pusher 16 and the bore of sleeve 15 may be of square or other non-circular cross-section or a keyway may be provided as desired to insure absence of relative rotation between pusher and sleeve.

In my protective cover as designed for the conventional duplex electric receptacle as illustrated, the longitudinal axes of the sleeves 15 are parallel and spaced from each other a distance substantially equal to the distance between the midpoints of the plug receptacles of the duplex outlet (approximately 40 mm.).

The pronged head 18 of the pusher 16, as best seen in Fig. 5, comprises a base 21 adjacent the pusher shank 17, two spaced parallel webs 22 integral with and extending forwardly of the base 21, and a third web 23 integral with the base 21 and the uppermost portions of the two parallel side webs 22. The three webs are concavely shaped to provide four prongs 24. The concave portions 25 of the side webs 22 are cut more deeply than the concave portion in the upper web 23 to provide more clearance for appliance plugs having a more narrow or thinner insulating housing, of the type illustrated at 26 in Fig. 1. No interconnecting web is present between the lower edges of the parallel side webs 22 in order to provide ample clearance for the appliance cords 27 extending and depending from the appliance plugs 26 and 28.

Novel means are provided by the instant invention for mounting the protective cover 10 in operating position about the appliance cord plugs 26, 28 inserted in electric receptacles, and, as best shown in Fig. 2, preferably comprises a narrow strip 29 of dielectric material extending lengthwise of and bridging the open face of the housing 11. The strip 29 may be formed integrally with the housing, or may be separate therefrom and secured thereto as by means of tabs 30. In order to facilitate the insertion or removal of appliance plugs 26, 28 into or from the housing, the strip 29 is of relatively narrow width as illustrated, thereby freely permitting passage therepast on either side thereof of the appliance plugs.

The strip 29 lies in a plane substantially normal to the longitudinal axis of the pushers 16 and at the points 31 where the strip is intersected by the pusher axes, the width of the strip 29 is no greater than the distance between each prong opening of the outlet receptacle, or an approximate maximum width of 1 cm. in the conventional outlet. This is to permit the prongs of the appliance plugs 26, 28 to straddle the strip 29 about the points 31. In the preferred configuration of the strip 29, the same is widened both above and below the prong-straddle areas adjacent points 31 to form laterally extending pairs of lugs 32. The adjacent lugs 32 of each upper and lower pair on either side of the strip 29 are spaced from each other by the height of an appliance plug prong, indicated at "A" on plug 28 in Fig. 1, or approximately ¼".

Alternatively, the strip 29 may be widened in the area of point 31, and the widened area may have two parallel apertures provided therein, the apertures having a height, width, and spacing to receive therethrough the prongs of the appliance plug. In either described construction, it is the laterally extending area above the plug prong which provides the major bearing support surface for the housing 11 when in use, the lower lugs or the surrounding strip material serving primarily as a means of insuring proper alignment of the plug prongs with respect to the electric receptacle.

If desired, the lower pair of lugs 32 adjacent each point 31 on the strip 29 may be eliminated.

Figure 3:
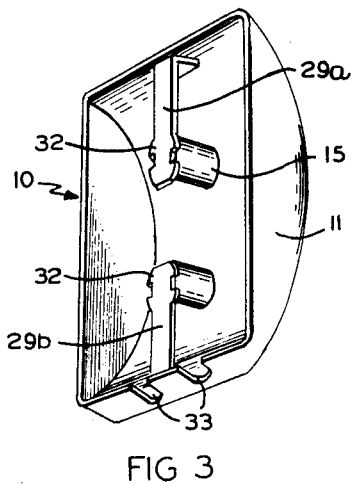
Fig. 3 is a perspective view of the protective cover showing a modified form of securing strip.

A pair of notches 33, best seen in the modified construction of Fig. 3, are provided in an end wall of the housing 11 to permit the appliance cords 27 to fit freely therethrough, as seeen in Fig. 1.

To place the protective cover in use, as illustrated in Fig. 1, an appliance plug 26 is placed within the housing with the prongs thereof arranged facing outwardly, straddling the strip 29, between the upper and lower pairs of lugs 32. The rear of the plug 26 is aligned approximately with the longitudinal axis of the pusher 16, the cord 27 dangling downwardly and fitted into one of the notches 33.

The other plug 28 is similarly placed and arranged in the housing 11 with respect to the other pusher 16. It is understood, however, that I have found that a single appliance plug, preferably located in cooperation with the upper pusher 16, is sufficient to support the housing and is equally protected thereby when mounted flush against the wall in vertical position as shown in Fig. 1.

The housing 11, with one or two appliance plugs placed therein as described, is faced against the wall outlet cover plate 13. While holding the housing 11 in one hand in this manner, the pushers 16 are forced inwardly with the thumb or forefinger through the housing wall apertures 14. This action brings the prongs 24 or concave web portions 25 to bear against their associated appliance plugs 26, 28, thereby urging the plugs into the wall electric receptacle. As the appliance plugs 26, 28 straddle the strip 29, the housing 11 will be supported in position by virtue of the frictional engagement between the prongs of the appliance plugs and the electric contacts within the wall receptacle.

As stated above, a single appliance plug placed within the housing is sufficient to support the same, and will be fully protected thereby. Although a single appliance plug is preferably placed in the position of plug 26, Fig. 1, to obtain a more desirable resolution of forces, the plug may be positioned in alignment with the lower pusher 16, if desired.

In the event of an excessively free fit between the plug prongs and the electric receptacle, the plug prongs may be slightly spread or compressed relative to one another, thereby obtaining better frictional engagement between the prongs and the receptacle, as well as ensuring more positive electrical connection therebetween.

The cooperation as above set forth between the appliance plugs 26, 28 and the narrow support strip 29 (29a, 29b in Fig. 3, to be described hereinafter) provides a simple and fully operative means for mounting and maintaining the protective cover 10 in position on the conventional vertical wall outlet. The function of the pushers 16 is to positively drive the appliance plugs firmly and fully into the electric receptacles to assure the firm mounting of the housing 11 as well as to provide good electrical contact for the otherwise relatively inaccessible plugs. My housing is thus entirely self-contained and requires no additional screws, bolts, clips or flanges to effect the proper mounting thereof. Nor is it necessary to loosen or otherwise tamper with the wall receptacle itself, thereby obviating any possible shock hazard in the mounting of my protective cover 10.

A further material advantage inherent in my construction is that the housing may be speedily and expeditiously removed from operative position by simply grasping the housing 11 and gently pulling outwardly thereon. The pulling force exerted will be transmitted to the narrow bridging strip 29 which in turn will withdraw the appliance plugs 26, 28 from their associated receptacles. It will be observed that the plugs are thus removed without the necessity of handling the plugs which are in close proximity to the line current, nor is it necessary, as is the case with other constructions, to remove or loosen any clamps or screws with the attendant delay and inconvenience.

As electric wall receptacles are usually located at a relatively low height above the floor, a hazard often encountered is that small children may receive electrical shock from contact with live appliance plugs not inserted fully in their associated sockets, or that the child may partially withdraw a plug from the socket or receptacle to such a position. Such danger is materially reduced and virtually eliminated by the construction of the protective cover 10. As best seen in Fig. 1, the bridging strip 29 is spaced slightly inwardly of the open plane face of the housing 11, whereby the rim of the housing lies substantially flush against the adjacent wall surface. Thus, the slightest outward force exerted upon the housing immediately tends to cause the strip 29 to withdraw the plugs 26, 28 from their sockets, thereby partially withdrawing the plugs even before the housing rim passes the outer plane surface of the cover plate 13. Further removal of the housing will only then permit access to the plug prongs, and before the gap between the housing 11 and cover plate 13 is sufficiently wide to permit the lateral insertion thereinto of a finger or a tool toward the plug prongs, the prongs will have been removed from electrical contact with the wall receptacle and are then harmless. The efficacy of the inward spacing of the strip 29 in this aspect of the invention is a function of the rigidity of the strip 29, which may be manufactured to the rigidity desired. The more rigid the strip 29, the more rapidly will the appliance plugs be removed from the wall receptable as the housing is withdrawn.

In Fig. 3 I illustrate a modified form of bridging strip in the housing 11. The strip may comprise two separate sections 29a, 29b, each secured at one end to the housing 11 in the same relation as the strip 29 of Fig. 1. The strips 29a, 29b extend inwardly toward each other and are provided with the series of laterally extending lugs 32 at their free extremities. Thus, the strips 29a and 29b of the modified form present the appearance of the preferred strip 29 as shown in Fig. 2, but with the medial portion thereof between the lower pair of lugs 32 of the upper set and the upper pair of lugs 32 of the lower set cut away.

Figure 7:
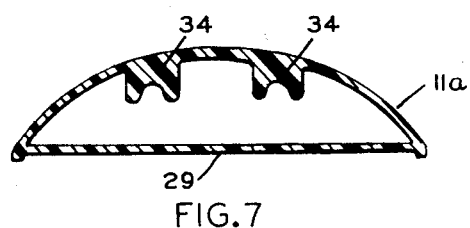
Fig. 7 is a side section of a modified form of cover.

A further modification of my protective cover is shown in Fig. 7, wherein it will be noted that the housing 11a is of materially less depth than the housing 11 of the preferred embodiment. To this end, the modified housing 11a is provided with pusher members 34 molded integrally with the housing rear wall, the said pusher members comprising substantially the head portion 18 of the preferred pushers 16 of Fig. 5. The reduction in housing depth is thus accomplished by the elimination of the pusher shanks 17 of the preferred pusher 16, the members 34 molded integral with the housing 11a performing the same function in the same manner as the preferred pusher head portion 18. To facilitate operation of the modified protective cover of Fig. 7, the rear wall of the housing 11a, or at least the portions thereof around the pusher portions 34 is made flexible and resilient to permit the modified pushers 34 to be flexed inwardly to accomplish the plug securing operation in the manner outlined above in connection with the embodiment of Fig. 1. Similar narrow support strip 29 (or 29a, 29b, as in Fig. 3) is employed with this modified housing 11a, and the structure, use and operation of the same is as disclosed for the other embodiment of the protective cover.

The protective cover 10, of course, may be provided with any desired ornamentation or coloration on its surfaces to render the cover pleasing to the eye or harmonious with the decor of a room in which the same is used. My protective cover 10 thereby provides an attractive structure in blending with its surroundings and concealing relatively unsightly appliance plugs in addition to the novel functional constructional features and advantages set forth above.

What I claim as my invention is:

1. A protective cover for enclosing electric cord plugs in electric plug receptacles, comprising a housing, a supporting element carried by said housing for cooperation with an electric cord plug in mounting said housing adjacent an electric receptacle, said housing having an access opening to permit initial positioning of an electric plug therein, a normally retracted pusher carried by said housing for inserting an electric plug in a receptacle, said housing having means operatively associated with said pusher to permit manual shifting movement of said pusher from retracted position to urge an electric plug into cooperation with said supporting element and to insert the plug within a receptacle, and means normally maintaining said pusher in retracted position prior and subsequent to manual shifting thereof.

2. A protective cover according to claim 1 wherein said access opening, comprises an open plane face of said housing, and said supporting element is disposed adjacent said face.

3. A protective cover according to claim 2 wherein said supporting element comprises a strip extending from a housing wall and disposed parallel to said open face, said strip having a portion thereof of a width substantially equal to the spacing between the prongs of an electric plug.

4. A protective cover according to claim 3 wherein said strip adjacent said portion is of greater width than said portion, said greater width strip portion being disposed above said first-named portion when said housing is disposed vertically.

5. A protective cover according to claim 4 wherein said strip interconnects two opposed sides of said housing.

6. A protective cover according to claim 4 wherein said housing has two of said strips, each extending towards each other from opposite sides of said housing, said strips terminating short of each other.

7. A protective cover according to claim 4 wherein said strip is spaced inwardly of said open face a distance substantially equal to the thickness of the cover plate of an electric receptacle.

8. A protective cover according to claim 4 wherein said first named means includes an apertured rear wall portion of said housing and a sleeve about said aperture extending forwardly from said rear wall, said pusher being slidably fitted within said sleeve.

9. A protective cover according to claim 8 wherein said pusher comprises a shank portion disposed in said sleeve and a plug-engaging head portion integral with said shank portion and disposed forwardly thereof.

10. A protective cover according to claim 9 wherein said plug-engaging head portion is provided with a plurality of forwardly extending prongs spaced from each other for engagement with certain types of appliance plugs.

11. A protective cover according to claim 10 having concave webs interconnecting certain of said prongs for engagement with certain other types of appliance plugs.

12. A protective cover according to claim 4 wherein said pusher is integral with the rear wall of said housing, and said first and second named means comprises a resilient and flexible rear wall area adjacent said pusher to permit manual deflection of said pusher forwardly toward said supporting element.

13 A protective cover according to claim 11 wherein said second named means comprises a plurality of tension springs interconnected between said sleeve and said pusher.

References Cited in the file of this patent

UNITED STATES PATENTS

| 1,909,648 | Austin | May 16, 1933 |
| 2,088,845 | Mask | Aug. 3, 1937 |
| 2,438,143 | Brown | Mar. 23, 1948 |
| 2,526,606 | Gregg | Oct. 17, 1950 |
| 2,761,112 | Torcivia | Aug. 28, 1956 |

FOREIGN PATENTS

| 469,005 | Canada | Oct. 31, 1950 |